United States Patent [19]

Shinoto

[11] Patent Number: 4,879,653

[45] Date of Patent: Nov. 7, 1989

[54] SELECTION SYSTEM FOR IDEOGRAPHIC CHARACTERS BY TOUCH TYPING USING PHONETIC/HIEROGLYPHIC CODES

[76] Inventor: Yoshinori Shinoto, 42,3-chome, Sakuradai, Nerima-Ku, Tokyo, Japan

[21] Appl. No.: 125,729

[22] Filed: Nov. 30, 1987

Related U.S. Application Data

[63] Continuation of Ser. No. 741,688, Jun. 6, 1985, abandoned.

[30] Foreign Application Priority Data

Jun. 7, 1984 [JP] Japan ................................. 59-115584

[51] Int. Cl.$^4$ ............................................... G06F 3/02
[52] U.S. Cl. ...................................... 364/419; 400/109
[58] Field of Search ................. 364/419; 400/109–111

[56] References Cited

U.S. PATENT DOCUMENTS

| | | | |
|---|---|---|---|
| 4,379,288 | 4/1983 | Leung .................................. | 400/110 |
| 4,498,143 | 2/1985 | Strzelecki ........................... | 400/110 |
| 4,505,602 | 3/1985 | Wong .................................. | 364/419 |
| 4,559,615 | 12/1985 | Goo ..................................... | 364/900 |

FOREIGN PATENT DOCUMENTS

| | | | |
|---|---|---|---|
| 2033633 | 10/1978 | United Kingdom ................ | 400/110 |
| 2057973 | 4/1981 | United Kingdom ................ | 400/110 |
| 2158776 | 11/1985 | United Kingdom ................ | 400/110 |

*Primary Examiner*—Jerry Smith
*Assistant Examiner*—Gail O. Hayes
*Attorney, Agent, or Firm*—Emmanuel J. Lobato; Robert E. Burns

[57] ABSTRACT

A system for ideographic character selection. Provision is made for selection of desired ideographic characters by use of designators termed combinational headwords each having a one-to-one correspondence with an ideographic character. The designators are phonetic/hieroglyphic coded and are applied to a reader the output of which is applied to a converter and to an output unit which outputs a signal corresponding to the desired Chinese or otherwise ideographic character which has been designated.

3 Claims, 4 Drawing Sheets

Fig. 5

| HIEROGLYPHIC SYMBOL | ╷ | ー | ノ | ＋ | ＃ | □ | ㄱ | く | 小 |
|---|---|---|---|---|---|---|---|---|---|
| NUMBER | 0 | 1 | 2 | 3 | 4 | 5 | 6 | 7 | 8 | 9 |
| STROKE | ┤ | │ | ー | ノ | ＋ | ╫ | □ | ㄱ ⇂ ⌐ ⌙ | く | 小 |
| | | ＼ 丁 ╱ | ⌒ → | ╱ | ⊤ ⊀ ╳ ⊃ | ╫ ⊀ ＃ | ▭ ▯ | ⌞ ⌄ ⌐ | ⋌ ⋋ ⋮ ⊥ | ⇃ ⇂ ⇃ ⇽ ⇐ ⇐ |

SELECTION SYSTEM FOR IDEOGRAPHIC CHARACTERS BY TOUCH TYPING USING PHONETIC/HIEROGLYPHIC CODES

This is a continuation, of application Ser. No. 06/741,688, filed June 6, 1985, and now abandoned.

BACKGROUND OF THE INVENTION

1. Field of the Invention

The present invention relates to a system for selecting a desired ideographic character or at least one word including at least one ideographic character from a plurality of ideographic characters each of which have an ideographic configuration containing hieroglyphic elements, such as Chinese characters.

2. Prior Art

As conventional selection systems of this kind, a character board input system and a keyboard input system are mainly employed for Chinese character selection in word processors which are now widely used for the rationalization of office work. The character board input system has an advantage that any operator can relatively easily use a word processor without requiring much skill, but has a disadvantage that it is necessary for the operator to learn the arrangement of 2000 to 3000 characters on the character board and even if the operator is acquainted with the manipulation of the character board, the input is limited in speed, and this makes speed-up of input operation impossible. The keyboard input system includes a Japanese 'Kana'-to-Chinese character conversion system, a Roman letter (phonetically represented 'Kana') to Chinese character conversion system, a two-stroke system and a multi-stage shift system. The former two systems select Chinese characters corresponding to 'Kana' instructed by operating the 'Kana' or Roman letter keyboard and referring to a built-in dictionary of the word processor in which Chinese characters are mainly defined in the base of their pronounciation in Japanese. These systems possess an advantage of relatively high-speed input but have a disadvantage that homonyms must be selected by some other selection operation. The two-stroke system is also called an associated code input system in which codes are predetermined so that all Chinese characters used are each associated with a pair of 'Kana' letters through utilization of a kind of mnemonics, and in which a desired one of the Chinese characters is identified by indicating the corresponding pair of 'Kana' letters. With the two-stroke system, however, special training is required while a high-speed input operation is possible, and furthermore the number of selectable characters is limited. The multi-stage shift system is also referred to as a Kanji Telex system or multi-stage stroke system. In the system, 8 to 15 Chinese characters are assigned to each key, while another shift key is used to specify a desired one of the Chinese characters allocated to each key. Accordingly, the selection of one Chinese character calls for operation of both one of the character keys and the shift key. This operation requires special training and the input speed is not so high, and further, the control panel is complex in mechanism.

SUMMARY OF THE INVENTION

An object of the present invention is to provide a selection system for ideographic characters which obviates the above defects of the prior art and which permits high-speed, alternative selection of a desired ideographic character or at least one word including at least one ideographic character by a relatively simple operation that does not call for special training.

BRIEF DESCRIPTION OF THE DRAWING

FIG. 5 is a diagram for explaining the principle of the present invention.

DESCRIPTION OF THE PREFERRED EMBODIMENT

Figure 1:
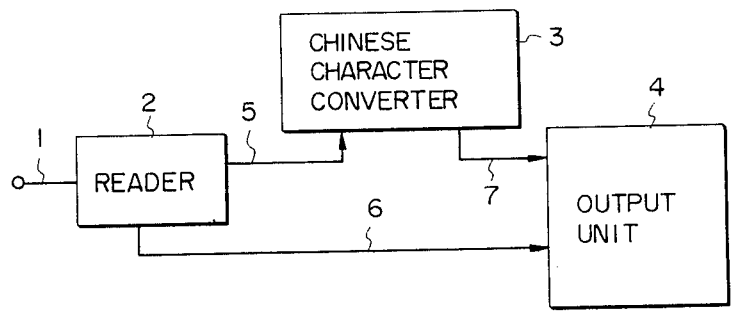
FIG. 1 is a block diagram illustrating an embodiment of a system according to the present invention.

The present invention will hereinafter be described in detail.

The present invention is directed to a system for selecting a desired ideographic character or at least one word including at least one ideographic character from a plurality of ideographic characters each of which has an ideographic constitution including hieroglyphic elements, such as Chinese characters. More specifically, the invention pertains to an ideographic character selecting system which is characterized in that a plurality of combinational headwords, each formed by a combination of a phonogram composed of phonetic characters or symbols which stands for spoken pronounciations of an ideographic character, such as Roman letters, 'Kana' letters, Hangul alphabets or phonetic signs, and a hieroglyphic word composed of at least one hieroglyphic symbol or number which stands for the configuration of the ideographic character, such as "shikakugouma", are predetermined to have one-to-one correspondence to the ideographic characters, so that a desired one of the ideographic characters, or at least one word including at least one ideographic character, is selected by indicating one of the combinational headwords in correspondence to the desired ideographic character.

Namely, an object to be selected by the selection system of the present invention is a set of ideographic characters (for example, Chinese characters) different from one another as mentioned above, from which a desired ideographic character or at least one word including at least one ideographic character is selected. In this case, the system of the present invention adopts different phonetic characters (for example, 'Kana') or phonetic symbols as a set of first headword elements and adopts at least one hieroglyphic symbol or number as a set of the second headword elements. At first, respective ones of a set of ideographic characters to be selected are represented by first headwards (namely, phonogram words), each of which is formed by using at least one of the first headword elements in accordance with the first category (for example, pronounciation of a Chinese character, namely, Chinese and Japanese pronounciations of a Chinese character or combination thereof). Moreover, respective ones of the same set of ideographic characters to be selected are represented by second headwords (namely, hieroglypheards), each of which is formed by using at least one of the second headword elements in accordance with the second category (for example, hieroglyph of a Chinese character).

Therefore, when it is desirable to select a desired ideographic character from the set to be selected, one first headword (phonogram word) is selected under the first category, and one second headword (hieroglyph word) is selected under the second category. Thus a combinational headword is obtained by combining the selected phonogram with the selected hieroglyph word. In this case, the phonogram word and the hieroglyphic word can be defined so that all the combinational headwords thus obtained will have one-to-one correspondence to ideographic characters in the set to be selected. However, the number of headword elements of the phonogram word and the hieroglyphic word composing each of the combinational headwords increases or decreases in accordance with the number of ideographic characters in the set to be selected.

Since the combinational headwords have one-to-one correspondence to the ideographic characters in the set to be selected, by adopting the above principle, when it is desirable to select one of those ideographic characters or at least one word including at least one ideographic character, a desired ideographic character or at least one word including at least one ideographic character can be selected by a selector directed to the combinational headword corresponding to the character or word to be selected. Of course, the combinational headword can also be transmitted after being encoded and then applied to the selection operation after decoding.

The above is the principle of the present invention. When it is desirable to select an arbitrary Chinese character of an ideographic character exemplifying Chinese characters as a set to be selected, the first headword (phonogram word) is formed by phonetic pronunciation of a Chinese character or Japanese pronunciation of it or combination thereof as the first category using 'kana' for the first headword elements, the second headword (hieroglyphic word) is formed by a configuration number of a Chinese character, such as "shikakugouma" as the second category using figures for the second headword elements, so that a combinational headword is formed by combining two headwords. When a given number or more is given to the number of 'kanas' (for example, 4 or less) forming a phonogram word and the number of figures (for example, 4 digits) forming a hieroglyphic word in this case, the combinational headwords can be made to have one-to-one correspondence to respective ones of a set of Chinese characters to be selected. If a selector is provided by which a desired Chinese character is selected by instructing the combinational headword, the desired Chinese character can be uniquely selected.

The above description concerns the case to use 'kana' for the first headword elements, but Roman letters, Hangul alphabets and other appropriate elements can be adopted as the first headword elements. Since the original pattern of phonetic representation is of pronounced speech, the first headword elements can be specified by entering voice or speech signals instead of specifying the first headword elements by operating keys.

A typical example of configuration numbers used in the present invention is "shikakugouma". In this hieroglyph principle, stroke shapes of all Chinese characters are classified into 10 kinds as shown in FIG. 5, and the individual stroke shapes are represented by figures from 0 to 9. Next, seeing only stroke shapes at four corners of each Chinese character, figures are allocated to them. The first stroke shape is at the left top corner, the second stroke shape at the right top corner, the third stroke shape at the left bottom corner and the fourth stroke shape at the right bottom corner as an assumption. Therefore, for example, in "行" of a Chinese character, since the first stroke shape corresponds to 2, the second stroke shape to 1, the third stroke shape to 2 and the fourth stroke shape to 2, a number 2122 given by lining up these figures is a configuration number of the Chinese character, "行". For example, both "暑" and "署" are specified by the same configuration number, "6060" if such a configuration number and phonetic pronunciation of a Chinese character or Japanese pronunciation of a Chinese character as a phonogram are adopted. By combinational headwords, "ﾂ 6060" and "ｼｮ 6060" formed by giving Japanese pronunciation of a Chinese character, "ｱﾂ" and phonetical pronunciation of a Chinese character "ｼｮ" to a configuration number, these can be uniquely specified in mutually discriminating them.

"署" and "諸" having the above phonetical pronunciation of a Chinese character, "ｼｮ" can also be uniquely selected by predetermining combinational headwords of combination of their respective configuration numbers, "6060" and "0466" and specifying corresponding one of them. As another example, "ｷ", "ｷ" and "ｴ" having identical phonetical pronunciation of a Chinese character, "ｿﾞ" can be selected by predetermining combinational headwords of combination of their respective configuration numbers, "2050", "3034" and "8060" and by specifying corresponding one of them.

(Table 1)

第 1 表

(Japanese pronunciation of Chinese Character) 「ゴウ」

(Hieroglyphic number)

(Example of Headwords of Homonyms)

Phonogram — 同音異義語 の 表示語例

| 表音語 | | | 訓読み | | | | 表形番号 | 表音語 | | 訓読み | | | | 表形番号 |
|---|---|---|---|---|---|---|---|---|---|---|---|---|---|---|
| 後 | おくれ | のち | あと | うしろ | おくれ | | | 2224 | 構 | かまえる | かまえ | かまえ | | | 4594 |
| 交 | まじわる | まじエル | まじル | ｷﾞﾔﾘ ｾﾏﾙ | かう | かわす | こもごも | 0040 | 江 | え | いりえ | おおえ かわ | | | 3111 |
| 佼 | カﾞｲ | | | | | | | 2024 | 洸 | おおみず | | | | | 3418 |
| C | 徑 | まと | きみ | | | | | 2723 | 洁 | いさぎよい | きよい | | | | 3416 |
| C | 侯 | わたのう | さぶらう | まつ | かろう | かろう | | 2723 | 港 | みなと | | | | | 3411 |
| | 倖 | さいわい | | | | | | 2424 | 溘 | みず | | | | | 3515 |

| 漢字 | 表音語 | | | | | | | 表形番号 | 漢字 | 表音語 | | | | | | | 表形番号 |
|---|---|---|---|---|---|---|---|---|---|---|---|---|---|---|---|---|---|
| 光 | ひかる | ひかり | | | | | | 9021 | 甲 | よろい | つめ | かん | かぶと | | | | 6050 |
| 公 | おおやけ | きみ | | | | | | 8073 | 皇 | かみ | きみ | すめらぎ | すめら | | | | 2610 |
| 功 | いさお | | | | | | | 1412 | 硬 | かたい | | | | | | | 1164 |
| 厚 | あつい | | | | | | | 7124 | 稿 | わら | したがき | | | | | | 2092 |
| 口 | くち | | | | | | | 6000 | 糠 | ぬか | | | | | | | 9093 |
| 向 | むく | むかう | むき | さきに | むかい | むける | むこう | 2722 | 紅 | べに | くれない | あかい | | | | | 2191 |
| 后 | きみ | きさき | | | | | | 7226 | 紘 | おおつな | | | | | | | 2493 |
| 喉 | のど | | | | | | | 6703 | 絞 | くびる | しぼし | しぼり | しめる | しまる | | | 2094 |
| 坑 | あな | あなごう | | | | | | 4011 | 綱 | つな | | | | | | | 2792 |
| 垢 | あか | はじ | | | | | | 4216 | 耕 | たがやす | | | | | | | 5590 |
| 好 | このむ | すく | よい | すれたい | よしみ | よし | | 4744 | 考 | かんがえる | かんがえ | | | | | | 4420 |
| 孔 | あな | はなはだ | | | | | | 1241 | 肯 | うべなう | きかいれて | | | | | | 2122 D |
| 孝 | | | | | | | | 4440 | 肱 | ひじ | | | | | | | 7423 |
| 宏 | ひろい | | | | | | | 3043 | 腔 | うつろ | からだ | わきばら | | | | | 7321 |
| 工 | たくみ | わざ | つかさ | | | | | 1010 | 膏 | あぶら | | | | | | | 0022 B |
| 巧 | たくみ | さとい | | | | | | 1112 | 航 | わたし | | | | | | | 2041 |
| 巷 | ちまた | | | | | | | 4471 | 荒 | あれる | あらす | すさむ | あらい | あれ | | | 4421 |
| 幸 | さいわい | さきわい | しあわせ | さきわう | ねがう | みゆき | さち | 4040 | 行 | みち | ゆく | いく | ゆくゆく | おこなう | たてぬき | おこない | 2122 D |
| A 広 | ひろい | ひろめる | ひろげる | ひろがる | ひろまる | ひろがる | | 0023 | 衡 | はかり | はかる | | | | | | 2143 |
| A 庚 | かのと | | | | | | | 0023 | 講 | とき | ハケル | なれる | きかまる | | | | 0564 |
| A 康 | やすい | | | | | | | 0023 | 貢 | みつぐ | みつぎ | | | | | | 1080 |
| 弘 | ひろい | ひろめる | | | | | | 1223 | 購 | あがなう | | | | | | | 6584 |
| 恒 | つね | つねに | | | | | | 9101 | 郊 | いなか | | | | | | | 0742 |
| 慌 | くらい | あわてる | あわただしい | | | | | 9401 | 酵 | もと | わく | さけかす | | | | | 1464 |
| 抗 | あがう | あたる | ふせぐ | | | | | 5001 | 鉱 | あらがね | | | | | | | 8013 |
| 拘 | とどめる | とらえる | かかわる | かかわれ | | | | 5702 | 石壙 | あらがね | | | | | | | 1068 |
| 控 | ひかえる | ひかえ | | | | | | 5301 | 鋼 | はがね | | | | | | | 8712 |
| 攻 | おさめる | せめる | | | | | | 1814 | 閘 | くぐりと | | | | | | | 7760 |
| 昂 | あがる | たかい | | | | | | 6012 | 降 | おりる | くだし | ふる | くだす | おろす | | | 7725 |
| 晃 | あきらか | | | | | | | 6021 | 項 | うなじ | | | | | | | 1118 |
| 更 | あらたまる | かわる | へる | さらに | さら | ふける | ふかす | 1050 | 香 | かおり | か | こうばし | かおる | | | | 2060 |
| 杭 | わたし | くい | | | | | | 4091 | 高 | たかい | たかまる | たかげ | たか | たかめる | | | 0022 B |
| 校 | あぜ | くらべる | かんがえる | ただす | あぜ | | | 4094 | 鴻 | おおとり | なしくい | | | | | | 3712 |
| 梗 | やまぶれ | ふさぐ | つよい | | | | | 4194 | 剛 | つよい | こわい | | | | | | 7220 |
| 効 | ならう | いたす | きく | ききめ | | | | 0442 | 勾 | かぎ | まがる | くぎる | | | | | 2772 |

第 2 表 (Table 2)

(Japanese pronounciation of Chinese character) (Phonogram) (Hoeroglyphic number)

「ショウ」

同音異義語 の 表示語 例 (Example of Headwords of Homonyms)

| 漢字 | 表音語 | | | | | | 表形番号 | 漢字 | 表音語 訓読み | | | | | | 表形番号 |
|---|---|---|---|---|---|---|---|---|---|---|---|---|---|---|---|
| 拾 | ひろう | とお | | | | | 5806 | 焼 | ヤク | ヤキ | ヤケル | | | | 9481 |
| 傷 | きず | きずつける | やぶれる | いたむ | いためる | | 2822 | 焦 | こがす | こげる | こがれる | あせる | | | 2033 |

| | | | | | | | | | | | | | | | |
|---|---|---|---|---|---|---|---|---|---|---|---|---|---|---|---|
| 償 | つぐなう | つぐない | | | | | | 2928 | 照 | てらす | てる | てり | てれる | | | 6733 |
| 勝 | たえる | かつ | まさる | | | | | 7922 | 症 | しるし | | | | | | 0011 |
| 匠 | たくみ | | | | | | | 7171 | 省 | みる | かえりみる | はぶく | | | | 9060 |
| 升 | のぼる | ます | | | | | | 2440 | 硝 | かやく | | | | | | 1962 |
| 召 | めす | | | | | | | 1760 | 礁 | かくれいし | | | | | | 1063 |
| 哨 | みはり | | | | | | | 6902 | 祥 | さいわい | | | | | | 3825 |
| 商 | あきなう | はかる | | | | | | 0022 | 称 | はかる | となえる | かなう | となえ | あげる | たたえる | ほめる | 2899 |
| 唱 | となえる | うたう | うた | | | | | 6606 | 章 | あや | しるし | あざらか | ふみ | | | 0040 |
| 賞 | ほめる | ことほぐ | かつて | | | | | 9060 | 笑 | わらう | えむ | わらい | | | | 8843 |
| 奨 | すすめる | はかる | たすける | | | | | 3243 | 粧 | よそおう | よそおい | | | | | 9091 |
| 妾 | かけ | わらわ | | | | | | 0040 | 紹 | つぐ | | | | | | 2759 |
| 娼 | みやぎ | | | | | | | 4646 | 肖 | にる | かたどる | あやかる | | | | 9022 |
| 宵 | よい | | | | | | | 3022 | 菖 | しょうぶ | | | | | | 4460 |
| 将 | ひきいる | | | | | | | 3214 | 蒋 | すこも | ほげする | | | | | 4424 |
| 小 | ちいさい | こ | お | すくない | さ | | | 9000 | 薫 | あくた | やぶれる | きあざ | | | | 4433 |
| 少 | すくない | すこし | しばらく | わかい | | | | 9020 | 衝 | つく | | | | | | 2110 |
| 尚 | くわえる | たっとぶ | なお | ひさしい | | | | 9022 | 裳 | も | もすそ | | | | | 9073 |
| 庄 | ひろさと | たいらか | | | | | | 0021 | 訟 | あらがう | うったえる | うったえ | | | | 0363 |
| 床 | ゆか | とこ | ゆかしい | | | | | 0029 | 証 | あかし | | | | | | 0161 |
| 厳 | うまや | ことば | | | | | | 0024 | 詔 | つげる | みことのり | | | | | 0766 |
| 彰 | あや | あきらか | あらわれ | | | | | 0242 | 詳 | くわしい | つまびらか | | | | | 0865 |
| 承 | うける | うけたまわる | | | | | | 1723 | 象 | かた | かたどる | のり | | | | 2723 |
| 抄 | とる | すくう | | | | | | 5902 | 賞 | ほめる | | | | | | 9080 |
| 招 | まねく | まねき | | | | | | 5706 | 醤 | ひしお | | | | | | 2760 |
| 掌 | たなごころ | つかさどる | | | | | | 9050 | 鉦 | かね | | | | | | 8111 |
| 捷 | かつ | はやい | | | | | | 5508 | 鐘 | さかずき | かつ | めし | | | | 8211 |
| 昇 | のぼる | | | | | | | 6044 | 鍾 | かね | | | | | | 8011 |
| 昌 | さかん | | | | | | | 6060 | 障 | へだて | ふせぐ | ふせぎ | さわり | さわる | | 7024 |
| 昭 | あきらか | | | | | | | 6706 | 鞘 | さや | | | | | | 4952 |
| 晶 | あきらか | | | | | | | 6066 | 性 | さが | たち | | | | | 9501 |
| 松 | ねつ | | | | | | | 4893 | 正 | ただす | ただしい | まさに | かみ | まさ | | 1010 |
| 梢 | こずえ | | | | | | | 4992 | 清 | きよい | きよめる | きよまる | | | | 3512 |
| 樟 | くす | | | | | | | 4094 | 摂 | おさめる | かねる | とる | | | | 5103 |
| 樵 | きこる | きこり | | | | | | 4093 | 憧 | あこがれる | あろか | | | | | 9001 |
| 沼 | ぬま | | | | | | | 3716 | | | | | | | | |
| 消 | きえる | けす | | | | | | 3912 | | | | | | | | |
| 渉 | わたる | かかわる | | | | | | 3112 | | | | | | | | |
| 湘 | | | | | | | | 3610 | | | | | | | | |

Seeing Chinese characters having phonetical pronounciation of a Chinese character of "ショ" and "ショウ" as typical examples of a homonym group through "Chinese Dictionary File Contents List" edited based on JIS C 6226, "Chinese Character Code System for Information Interchange" (Table 1 and Table 2) by Japan Electronic Industry Development Association, Chinese characters of about 90% can be uniquely selected by combinational headwords, each composed of a phonogram of phonetical pronounciation of a Chinese character and configuration number. However, A, B, C, D, E, F and G show Chinese characters being the same in combinational headwords among these homonym groups with the same character in Table 1 and Table 2. To distinguish them, all of Chinese characters can be uniquely perfectly specified by combinational headwords of a phonogram word of Japanese pronounciation of a Chinese character and a configuration number. 'Hiragana' is Japanese pronounciation of a Chinese character, and 'katakana' is its declensional 'kana' ending.

By using a phonetic character of Japanese pronounciation of a Chinese character for Chinese characters of about remaining 10% of the above hononym group or taking 'fukaku' of the "shikakugouma" index method or the feature point of a Chinese character as a hieroglyphic character element, all of those homonyms can be uniquely specified. For example, though both configuration numbers of Chinese characters, " ₰ " and " ₳ " are "2723", those can be uniquely specified by giving combinational headwords of " ₰ " to "₰₰2723" and " ₰ " to " ₰₰2723" based on phonetical pronounciation of a Chinese character and Japanese pronounciation of a Chinese character. Chinese characters of " ₰ " and " " can also be uniquely specified by giving combinatic* al headwords of a Chinese character, " ₳ " to " ₳-27230" and picking up a vertical bar of " ₰ ", a hieroglyphic character element, i.e., a configuration number of 2 as its feature point ('futen') and giving combinational headwords of '₳ " to "₳₰2723". The present invention can be applied to selection of individual ideographic characters besides selection of a word (for example, a Chinese compound word) including an ideographic character.

To uniquely specify a Chinese compound word of an ideographic character block, the Chinese compound word can be uniquely specified even if hieroglyphic numbers of individual Chinese characters composing a Chinese compound word are not given. For example, " ₰₰₰ " can be uniquely specified by combinational headwords "₰₰₰₰2723" of "₰₰₰₰", a phonogram word and "2723", a hieroglyphic number of " ₰ ", and this is an input method that is useful for improvement of input speed.

In entering a clause based on combinational headwords, a sentence including Chinese characters in addition to "kana" letters can be entered by combination of a so called "separate-indication method" (leaving a space between words) with the above Chinese compound word input method without using the Chinese character starting symbol < and the Chinese character ending symbol > described later. For example, a hieroglyphic number independent of numerical keys, such as ten keys should be entered in order to avoid confusion of input of a hieroglyphic number and that of figures. A series of " ₰₰₰8020₰₰₰₰₰₰1043" is entered in order to output₰"₰₰. ₰₰₰₰₰₰" (It's fine today). Since the hieroglyph numbers of " ₰ ", " ₳ ", " ₰ ", " ₰ ", " ₰ ", " " and " ₰ " are respectively 8020, 6010, 1043, 8041, 0090, 5103 and 4295, it is easy to distinguish "₰₰" from " ₰ " and " ₰₰ " from " ". When outputting a sentence including Chinese characters:₰"₰₰₰₰₰₰₰₰₰."(A red baloon is flying) with a combinational headword group of a phonetic character group based on the separate indication method, and a hieroglyphic number block, it is entered as follows: " ₰₰₰4033  ₰₰₰₰7721  ₰₰1241 ₰₰". Since the hieroglyphic numbers of " ₰ ", " ₳ ", " ₰ ", " ₰ ", " ₳ ", " ₰ ", " ₳ " and " ₰ " are respectively 4033, 7721, 2846, 1241, 6702, 0761, 2227 and 6211, it is easy to distinguish "₰ " from " ₰ ", "₳ " from " ₳ " and "₰" from " ₰ ".

Next, preparation of a character series including 'kana' and Chinese characters will be described as a concrete example of the system of the present invention. FIG. 1 is a block diagram showing its embodiment.

Input data 1 of a character series (including alphabets, figures, etc. hereinafter referred to as 'kana' character series in the present invention), which is mainly composed of 'kana' but including a Chinese character portion (hereinafter referred to as Chinese character phonetic/hieroglyphic code) and represented by 'kana' and hieroglyph numbers based on combination of each phonogram word put in a Chinese character starting and a Chinese character ending symbol and each hieroglyphic word, is applied to the reader 2. When the above Chinese character starting symbol is received, input data received until a next Chinese character ending symbol is decided as a Chinese phonetic/hieroglyphic code, which is sent via a signal path 5 to a Chinese character converter 3. A Chinese character equivalent to the Chinese character phonetic/hieroglyphic code is determined and selected using the Chinese character converter 3 by the combination of the phonogram word portion of the Chinese phonetic/hieroglyphic code and a hieroglyph number portion, and sent via a signal path 7 to an output unit 4. The 'kana' letter series other than the Chinese phonetic/hieroglyphic code is directly sent via a signal path 6 from the above reader 2 to the output unit 4.

If symbols of parentheses < and > are respectively used for the Chinese character starting symbol and the Chinese character ending symbol, for example, a short sentence of "₰₰₰₰₰₰₰₰₰" (A red baloon is flying) is represented by "< ₰ > ₰ <₰₰>₰₰₰₰₰₰" Further, if the Chinese character portion of the above short sentence is represented using the above Chinese character phonetic/hieroglyphic code, <₰₰4033>₰ < 7721 ₰₰2846> ₰ <₰₰1241> is given. In addition to < and > parenthesis symbols, / (slash) and (space) may be used for a Chinese character designation symbol (The combination of the Chinese character beginning starting symbol and the Chinese character ending symbol will hereinafter be referred to as the Chinese character designation symbol). Functionally, the same signal may be used for the Chinese character starting symbol and for the Chinese ending symbol, but < is used for the Chinese character starting symbol and > for the Chinese character ending symbol for convenience of description in the present specification.

When the symbol < is received first at the reader 2 in FIG. 1, the reader 2 decides that data to be received thereafter is a Chinese character phonetic/hieroglyphic code and holds the said decision in order to accept the said Chinese character phonetic/hieroglyphic code. When " 4033" is received in sequence, it is sent via the signal path 5 to the Chinese character converter 3, a Chinese character of "₰₰" is selected by a prebuilt-in logic circuit and sent to the output unit 4. Next, when the symbol > is received, data to be received thereafter is decided 'kana' and the reader 2 is released from the Chinese character phonetic/hieroglyphic code acceptance status. Therefore, data " ₰ " to be received next is sent via its signal path 6 to the output unit 4. In a character series to be received in the same way as mentioned above, the Chinese character phonetic/hieroglyphic codes are converted to Chinese characters, and the 'kana' portions are directly sent to the output unit and finally converted to a character series including 'kana' and Chinese characters of " ₰₰₰₰₰₰₰ " (a red baloon is flying).

(Hieroglyphic Symbol and
Hieroglyphic Number)

(Pronounciation)

(Chinese
character)

(Phonetic/Japanese
pronounciation Code of
第 3 表 (Table 3) Chinese character)

| 漢字 | 読み | 表形記号と<br>表形番号 | 漢字音訓表形コード |
|---|---|---|---|
| 赤 | ア カ | 十一 ヽ ヽ<br>4 0 3 3 | ア カ 4 0 3 3 |
| 風 | カ ゼ | ノ ゝ l 一<br>7 7 2 1 | カ ゼ 7 7 2 1 |
| 船 | フ ネ | l 八 十 口<br>2 8 4 6 | フ ネ 2 8 4 6 |
| 飛 | ト ブ | 一 l 十 一<br>1 2 4 1 | ト ブ 1 2 4 1 |

The Chinese characters that appear in this short sentence are represented as shown in Table 3 using a phonetic/hieroglyphic code. Concrete examples of circuits used for the above embodiment will be described in detail with reference to FIG. 2 to FIG. 4.

Figure 2:
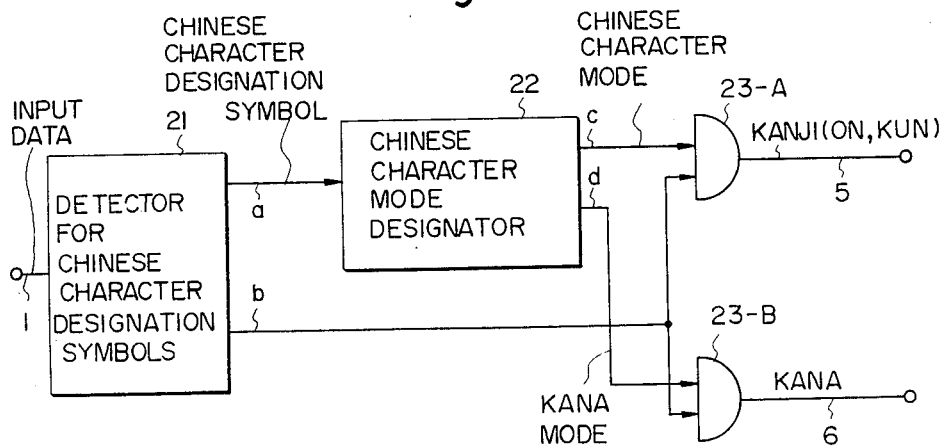
FIG. 2 is a block diagram of a reader used in the system of FIG. 1.

FIG. 2 shows an example of the arrangement of the reader 2 in FIG. 1. A 'kana' letter series of input data is applied to a detector 21 for Chinese character designation symbols, and the Chinese character designation symbol is sent from a of two output terminals a and b of the above detector 21 to a Chinese character mode designator 22. A 'kana' letter series other than the Chinese character designation symbols is sent from b to AND gates 23-A and 23-B. The above Chinese character mode designator 22 takes two statuses; it takes the status c (namely, Chinese character mode) with a Chinese character designation symbol at a standing of an odd number (namely, Chinese character starting symbol) while it takes the status d (namely, 'kana' mode) with the Chinese character designation symbol at a standing of an even number (namely, Chinese character ending symbol). That is, the said statuses c and d remain unchanged until the next Chinese character designation symbol arrives. The AND gate 23-A has a function to send a 'kana' letter series, namely, a Chinese character phonetic/hieroglyphic code sent from the output terminal b of the above Chinese character designation symbol detector 21 via the signal path 5 to the Chinese character converter 3, when the Chinese character mode designator 22 holds the status c, namely, Chinese character mode. The AND gate 23-B has a function to directly send the 'kana' letter series, i.e., the 'kana' portion sent from the output terminal b of the above Chinese character designator symbol detector 21 to the output unit 4 through the signal path 6 when the Chinese character mode designator 22 holds the status d, i.e., 'kana' mode.

The operation of this embodiment will be described concerning the first portion, "<ｱ=4033> ｨ " in the above short sentence. FIG. 4 is the time chart showing the flow of data. When the symbol < is applied to the detector 21 for Chinese character designation symbols in FIG. 2, the Chinese character designation symbol is sent from its terminal a to the Chinese character mode designator 22, when the mode designator 22 takes the status "c". Next, a signal of "ｱ=4033" sent in sequence is sent out from the output terminal b of the Chinese character designation symbol detector 22 to the input terminal of the AND gate 23-A. Then two letters and four numerals of "ｱ=4033" are sent out from the output terminal of the AND gate 23-A via the signal path 5 to a phonetic/hieroglyphic code resister 30 of the Chinese character converter 3 in FIG. 3.

Figure 3:
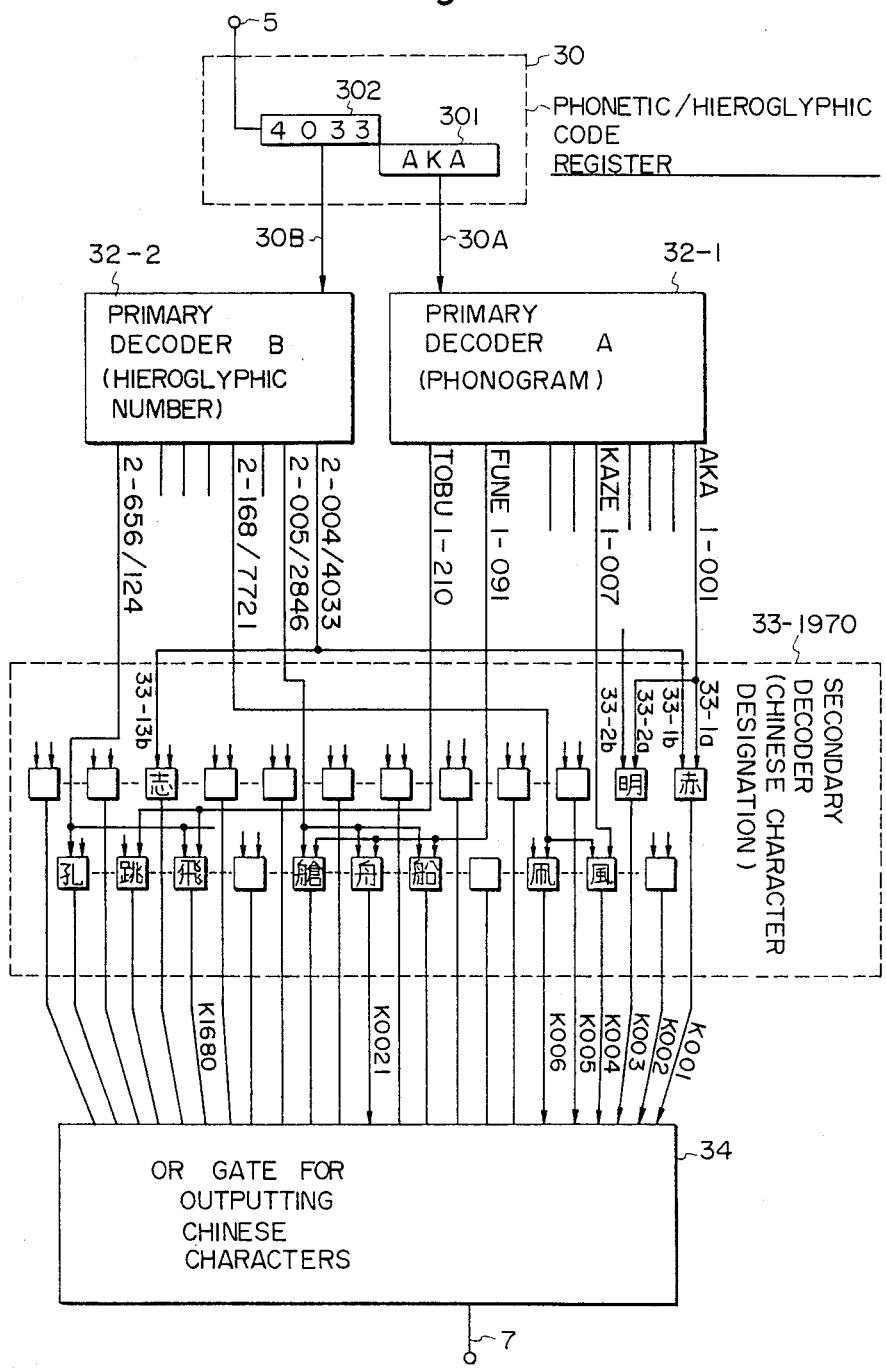
FIG. 3 is a block diagram of a Chinese character convertor used in the system in FIG. 1.
Figure 4:
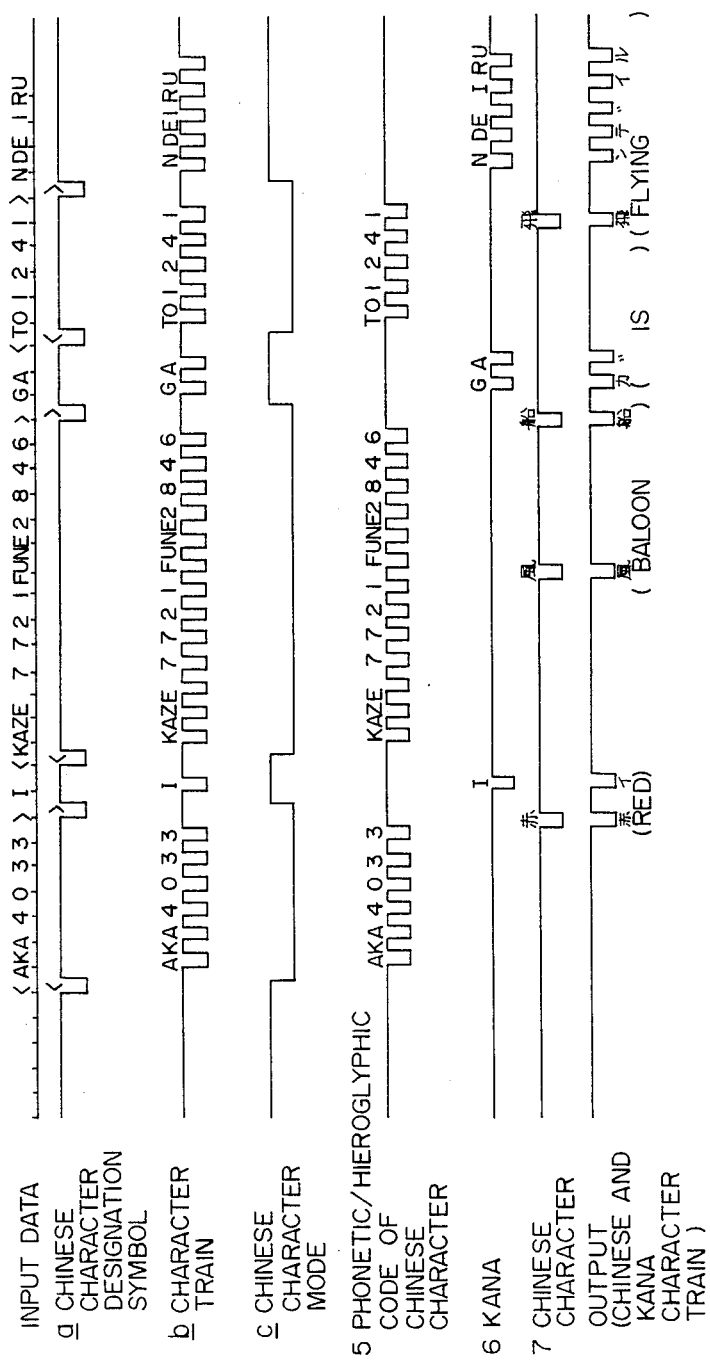
FIG. 4 is a timing chart explanatory of the operation of an example in which "kana"-to-Chinese character conversion is performed by the system in FIG. 1.

FIG. 3 is a diagram showing a concrete example of the Chinese character converter 3 in FIG. 2. The phonetic/hieroglyphic code register 30 consists of one or more phonogram circuits and four hieroglyphic number circuits, five or more in total. For two letters and four numerals of "ｱ=4033", a hieroglyphic code sent from the AND gate 23-A in FIG. 2, phonograms "ｱ=" are sent in a phonogram register 301, and a hieroglyphic number, "4033" in a hieroglyphic number register 302. After five or more phonetic hieroglyphic code register 30 stated above have all storaged, the letters of "ｱ=" are sent from the phonogram register 301 to a primary decoder A (32-1), where they are decoded. The decoded output is applied from a terminal 1-001 of "ｱ=" of output terminals of the primary decoder 32-1 to one terminal of each of those of secondary decoders 33 which are connected to "ｱ=", such as (33-1a) and ￫(33-2a). The four numerals of the hieroglyphic number, "4033", are sent from the hieroglyphic number register 302 of the phonetic/hieroglyphic register 30 to a primary decoder B (32-2) at the same time, when they are decoded, and the decoded output is applied from a terminal of 2004 hieroglyphic number "4033" of output terminals of the said primary decoder (32-2) to one terminal of each of those of the secondary decoders 33 which are connected to the hieroglyphic number, "4033", such as ￫ (33-1b) and ￫ (33-13b) decoder 33. Since the secondary decoder 33 with the two input terminals thus loaded with data is has only (33-1a, 33-1b), an output K0001 is obtained from it and a signal of a Chinese character, ￫ , is sent via a Chinese character OR gate 34 to the output unit 4 routing a signal path 7. As described above, the symbol applied to the detector 21 for Chinese character designation symbols is sent from the terminal a to the Chinese character mode designator 22. The Chinese character mode designator 22 that has held the Chinese character mode status c so far is released from the status c to satisfy the status d, i.e., 'kana' mode. The character "ㅅ", sent after that, is sent from the terminal b to the AND gate 23-B, the after being sent from its output terminal via the signal path 6 to the output unit 4. In this way, the signal of a character series including and Chinese character is obtained.

The above description has been given of the example in which the Chinese character phonetic/hieroglyphic code is represented using the 'kana' and the hieroglyphic number. If a Chinese character phonetic/hieroglyphic code is prepared using Roman letters or Hangul alphabets, data can be produced using an English typewriter or a Hangul character typewriter or audio input unit to obtain a character series including 'kana' (or Hangul characters) and Chinese characters.

(Table 4(1))
第 4 表 (1)
中國語 (Chinese characters)

(Phonogram) 表言語 (Hieroglyphic Number) 表形号码  |  (Phonogram) 表音語 (Hieroglyphic Number) 表形号码

| 字 | 拼音字母 | 注言字母 | 四角号码 |  | 字 | 拼音字母 | 注言字母 | 四角号码 |
|---|---|---|---|---|---|---|---|---|
| 红 | HONG | ㄏㄨㄥ | 2114 |  | 汆 | QIÚ | ㄑㄧㄡ | 1319 |
| 弘 | " | " | 1223 |  | 公 | " | " | 4073 |
| 泓 | " | " | 3213 |  | 永 | " | " | 4390 |
| 呱 | " | " | 6403 |  | 俅 | " | " | 2329 |
| 宏 | " | " | 3073 |  | 逑 | " | " | 3330 |
| 閎 | " | " | 7743 |  | 毬 | " | " | 2371 |
| 垃 | " | " | 0413 |  | 裘 | " | " | 4373 |
| 紘 | " | " | 2493 |  | 賕 | " | " | 6389 |
| 浤 | " | " | 3418 |  | 璆 | " | " | 1712 |
| 洪 | " | " | 4418 |  | 虬 | " | " | 5211 |
| 鴻 | " | " | 3712 |  | 蚯 | " | " | 5210 |
| 虹 | " | " | 5111 |  | 囚 | " | " | 6080 |
| 紅 | " | " | 4411 |  | 泅 | " | " | 3610 |
| 賞 | " | " | 9080 |  | 訧 | " | " | 1011 |
| 蒜 | " | " | 4478 |  | 酋 | " | " | 8060 |
|  |  |  |  |  | 遒 | " | " | 3830 |
|  |  |  |  |  | 蝤 | " | " | 5816 |
|  |  |  |  |  | 犰 | " | " | 4421 |
| 气 | QI | ㄑㄧ | 8001 |  | 訧 | " | " | 4001 |
| 氣 | " | " | 8091 |  | 仇 | " | " | 2421 |
| 汽 | " | " | 3811 |  |  |  |  |  |
| 讫 | " | " | 3871 |  |  |  |  |  |
| 运 | " | " | 3830 |  |  |  |  |  |
| 憩 | " | " | 7133 |  | 飞 | FEI | ㄈㄟ | 1201 |
| 契 | " | " | 5780 |  | 妃 | " | " | 4741 |
| 湽 | " | " | 5790 |  | 飛 | " | " | 1241 |
| 棄 | " | " | 0044 |  | 非 | " | " | 1111 |
| 弃 | " | " | 0090 |  | 啡 | " | " | 6101 |
| 器 | " | " | 6666₀ | 附角号码 | 菲 | " | " | 4411 |
| 噐 | " | " | 6666₁ |  | 緋 | " | " | 2111 |
| 愒 | " | " | 2633 |  | 扉 | " | " | 3021 |
| 憇 | " | " | 2433 |  | 霏 | " | " | 1113 |
| 砌 | " | " | 1762 |  | 靐 | " | " | 1011 |
| 棄 | " | " | 5040 |  | 騑 | " | " | 7131 |
| 泣 | " | " | 3011 |  |  |  |  |  |
| 墅 | " | " | 4440 |  |  |  |  |  |
| 呓 | " | " | 1710 |  |  |  |  |  |
| 碛 | " | " | 1568 |  |  |  |  |  |
| 跂 | " | " | 6414 |  |  |  |  |  |

(Table 4(2))

第 4 表 (2)

中國語 (Chinese characters)

Phonogram: Chuon alphabets, Heion alphabets
Shikakugouma: Hieroglyphic number

| 汉字 | 拼音字母 | 注音字母 | 四角号码 |
|---|---|---|---|
| 行 | XÍNG | ㄒㄧㄥ | 2122 |
| 刑 | 〃 | 〃 | 1240 |
| 铏 | 〃 | 〃 | 8270 |
| 钘 | 〃 | 〃 | 8174 |
| 硎 | 〃 | 〃 | 1260 |
| 型 | 〃 | 〃 | 1210 |
| 邢 | 〃 | 〃 | 1742 |
| 形 | 〃 | 〃 | 1242 |
| 陉 | 〃 | 〃 | 7721 |
| 荥 | 〃 | 〃 | 4490 |
| 饧 | 〃 | 〃 | 2772 |
|  |  |  |  |
|  |  |  |  |
| 今 | JĪN | ㄐㄧㄣ | 8020 |
| 巾 | 〃 | 〃 | 4022 |
| 斤 | 〃 | 〃 | 7222 |
| 劤 | 〃 | 〃 | 2422 |
| 筋 | 〃 | 〃 | 8822 |
| 衿 | 〃 | 〃 | 3822 |
| 矜 | 〃 | 〃 | 1822 |
| 金 | 〃 | 〃 | 8010 |
| 禁 | 〃 | 〃 | 4490 |
| 襟 | 〃 | 〃 | 3429 |
| 津 | 〃 | 〃 | 3510 |
|  |  |  |  |
|  |  |  |  |
| 天 | TIĀN | ㄊㄧㄢ | 1080 |
| 添 | 〃 | 〃 | 3113 |
| 贴 | 〃 | 〃 | 4186 |
|  |  |  |  |
|  |  |  |  |
| 好 | HǍO | ㄏㄠ | 4744 |
| 郝 | 〃 | 〃 | 4732 |
|  |  |  |  |
|  |  |  |  |
|  |  |  |  |

Moreover, an applied example of this selection system to Chinese and Korean will be described. If only ones equivalent to merely 1.7% of about 10,500 (one font) Chinese characters, adopted in the "Modern Chinese Dictionary" (1983) edited by the Social Science Bureau Language Institute of China and the "Shikakugouma New Dictionary" (1979) edited and issued by the publishing firm, Shomu Insho Kan (Peking), are distinguished from each other by combinational headwords of a 5-digit hieroglyphic number using a "fukaku" by "shikakugouma" index method or the aforementioned feature point ('futen') of the Chinese character and a phonogram using a pronounciation and phonetic symbols (accent symbols) and alternatively or individually specified concerning Chinese characters, all of about 10,500 Chinese characters that are now used in Chinese can be uniquely selected.

Concrete examples (I, II) using a short sentence will be shown below.

---

Japanese writing (1): 紅い 気球 飛行ける。
Chinese writing: 紅　　气球　飞行
(Output)
'Heion' alphabets : HÓNG QÌQIÚ FĚIXÍNG
'Chuon' alphabets: ㄏㄨㄥˊ ㄑㄧˋㄑㄧㄡˊ ㄈㄟ ㄒㄧㄥˊ
Hieroglyphic number: 2111 8001 1319 1201 2122
("Shikakugohma")
Input (A): HÓNG2111 QÌ8001 QIÚ1319 FĚI1201 XÍNG2122
Input (B): ㄏㄨㄥˊ2111 ㄑㄧˋ8001 ㄑㄧㄡˊ1319 ㄈㄟ1201 ㄒㄧㄥˊ2122
Input (C): HÓNG2111 QÌQIÚ8001 FĚIXÍNG1201
Input (D): ㄏㄨㄥˊ2111 ㄑㄧˋㄑㄧㄡˊ8001 ㄈㄟㄒㄧㄥˊ1201

---

The inputs C and D are based on the Chinese compound word input method mentioned above.

Phonograms and hieroglyphic numbers related to the respective Chinese characters in the example based on the above "Modern Chinese Dictionary" and "Shikakugouma New Dictionary" are shown in Table 4.

---

Japanese writing: 今日は いい天気ですね。
Korean writing: 오 늘 은 무 척 날 씨 가 좋 습 니 다.
(Input/output):
Input (A): 오늘 은 무척 날 씨 가 좋 습 니 다
Input (B): O NEUL EUN MU CHEOG NAL SSI GA JOT EUB NI DA

---

Japanese writing (II): 今日, 天気は いい天気です。
Chinese writing:　　今天　天气　好
(Output)
'Heion' alphabets: JĪNTIĀN TIĀNQÌ HǍO
'Chuon' alphabets: ㄐㄧㄣㄊㄧㄢ ㄊㄧㄢㄑㄧˋ ㄏㄠˇ
Hieroglyphic number: 8020 1080 1080 8001 4744
("Shikakugohma")
Input (A): JĪN8020 TIĀN1080 TIĀN 1080 QÌ8001 HǍO4744
Input (B): ㄐㄧㄣ 8020 ㄊㄧㄢ1080 ㄊㄧㄢ1080 ㄑㄧˋ8001 ㄏㄠˇ4744
Input (C): JĪNTIĀN8020 TIĀNQÌ1080 HǍO4744
Input (D): ㄐㄧㄣㄊㄧㄢ8020 ㄊㄧㄢㄑㄧˋ1080 ㄏㄠˇ4744

---

Next, the case of Korean will be described. If only ones equivalent to merely 1.25% of about 1,830 Chinese characters that temporary limited Chinese characters are added to basic Chinese characters for selective education by the Education Division of the Republic of Korea are distinguished from each other by combinational headwords composed of a 5-digit hieroglyphic number using 'fukaku' of the "Shikakugouma" index method or the above-stated feature point ('futen') of a Chinese character and a phonogram of Hangul characters showing Korean pronounciation for Chinese characters or their alphabets and individually and uniquely designated, all of about 1,830 Chinese characters used for Korean can be uniquely selected. (In the Republic of Korea there is a tendency that compositions are made using only Hangul letters as seen in Government publications and novels.)

A concrete example using a short sentence is shown below.

---

Japanese writing: 赤い 風船 走っている。
Korean writing: 빨 간 풍 선 이 떠 있 다.
(Input/output):
Korean writing: 빨 간 풍 선 이 떠 있 다.
(Output)
Hieroglyphic number: 7721 2846
("Shikakugohma")
Input (A): 빨 간 풍 선 이 떠 있 다.
Input (B): 빨 간 풍 선 이 떠 있 다.
Input (C): 빨간 풍선 이 떠 있 다.
Input (D): 빨간 풍선이 떠 있다.
Input (E): BBAL GAN PUNG7721 SEON2824 I DDEO IO DA
Input (F): BBAL GAN PUNGSEON 7721 I DDEO IO DA

---

B, D and F of the inputs are based on the above Chinese compound word input method. The inputs E and F are based on the Roman letter spelling method of the Education Division style of the Republic of Korea. Phonograms and Hieroglyphic numbers related to the respective Chinese characters in the example are shown in Table 5. Next, Korean translated from Japanese writing is written only by Hangul letters.

Output of Hangul letters with input of Hangul alphabets or Roman letters is made possible by Hangul characters and input of Hangul alphabets or Roman letters by operating the shift key of composite consonants. In the case of input with Hangul characters, a type in which only all Hangul letters are laid out on the character board and an arrangement in which voices of those Hangul letters are applied can be adopted.

(Table 5)

第 5 表

| (phonogram) 表音語 | | | (Hieroglyphic number) 表形番号 | 韓國語 (Korean characters) (Phonogram) 表音語 | | | (Hieroglyphic number) 表形番号 |
|---|---|---|---|---|---|---|---|
| ハングル文字 | ハングル字母 | 文教部式 ローマ字 | 四角号碼 | ハングル文字 | ハングル字母 | 文教部式 ローマ字 | 四角号碼 |
| 風 | 풍 | ㅍㅜㅇ | PUNG | 7721 | 船 | 선 | ㅅㅓㄴ | SEON | 2846 |
| 楓 | 풍 | ㅍㅜㅇ | PUNG | 4791 | 兂 | 선 | ㅅㅓㄴ | SEON | 2421 |
| 豊 | 풍 | ㅍㅜㅇ | PUNG | 5510 | 仙 | 선 | ㅅㅓㄴ | SEON | 2227 |
| | | | | 線 | 선 | ㅅㅓㄴ | SEON | 2693 |
| | | | | 鮮 | 선 | ㅅㅓㄴ | SEON | 2835 |
| | | | | 善 | 선 | ㅅㅓㄴ | SEON | 8060 |
| | | | | 選 | 선 | ㅅㅓㄴ | SEON | 3730 |
| | | | | 宣 | 선 | ㅅㅓㄴ | SEON | 3010 |
| | | | | 旋 | 선 | ㅅㅓㄴ | SEON | 0828 |
| | | | | 禪 | 선 | ㅅㅓㄴ | SEON | 1695 |

(Effects and Modifications of the Invention)

Since the system of the present invention can prepare a character series including 'kana' (or Hangul) and Chinese characters simply by preparing data, for example, using character keys equivalent to 'kana' letters and numerals or Roman letters (or Hangul alphabets) and numerals, the operation is extremely simplified as compared with the conventional systems.

A sentence including 'kana' (or Hangul) letters and Chinese characters may be directly printed at the output stage, and transmitted as a signal series of an arbitrary code type. In this case, detailed description is omitted since this can be materialized using the conventional printing mechanism or the arrangement of an encoder.

The above description largely concerns the applied examples using Japanese, but the system of the present invention can also apply to the case to select not only Japanese but also foreign languages, such as Chinese and Korean. For example, reading ways of a Chinese character in Chinese being more than phonetic representations based on phonetic pronounciation of a Chinese character and Japanese pronounciation of it in Japanese exist usually. The system can apply to a case in which a desired Chinese character is selected by preparing combinational headwords of phonogram words each composed of appropriate selection of those pronounciations and hieroglyphic characters each composed of a hieroglyphic number.

In the Chinese character converter, respective circuit portions related to respective Chinese characters may be extracted from the phonetic/hieroglyphic code register, the primary decoders A and B, the secondary decoder and the OR gate to prepare separate conversion blocks for respective Chinese characters without laying out all the circuits related to the above-mentioned functions for all Chinese characters, for example, [あ] or [ア], as shown in FIG. 3.

This permits making each Chinese character block compact by applying the integrated circuit technology, and facilitates materialization of a word processor and a Chinese character typewriter that can perform its input operation at a high speed.

I claim:

1. A system for ideographic character selection comprising, storing means for storing a plurality of ideographic characters each of which has ideographic elements, means for forming by touch typing on a keyboard combinatorial headwords which have one-to-one correspondence with the ideographic characters stored in the storing means, means for combining a selected phonogram word with a selected hieroglyphic word to obtain selected one of the combinatorial headwords, and selector means for selecting a desired ideographic character output in correspondence with selection instruction thereto with the selected one of the combinatorial headwords obtained.

2. A system for ideographic character selection according to claim 1, in which the phonogram word is a symbol representing spoken sound formed by phonetic pronounciation of a Chinese character, Japanese pronounciation of the Chinese character, Korean pronounciation of the Chinese character or a combination thereof, and including means for forming the phonogram word.

3. A system for ideographic character selection according to claim 1, in which figures define said hieroglyphic headword, and including means for forming the hieroglyphic word.

* * * * *